(12) United States Patent
Shu et al.

(10) Patent No.: US 8,050,190 B2
(45) Date of Patent: Nov. 1, 2011

(54) METHOD AND DEVICE FOR FEEDING BACK LINK PARAMETER CONFIGURATION RESULT

(75) Inventors: Guiming Shu, Shenzhen (CN); Junxiang Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 12/254,147

(22) Filed: Oct. 20, 2008

(65) Prior Publication Data

US 2009/0086678 A1 Apr. 2, 2009

Related U.S. Application Data

(63) Continuation of application No. PCT/CN2006/003609, filed on Dec. 26, 2006.

(30) Foreign Application Priority Data

Apr. 19, 2006 (CN) .......................... 2006 1 0060436

(51) Int. Cl.
    *H04L 12/26* (2006.01)
(52) U.S. Cl. ........................................ 370/252; 370/331
(58) Field of Classification Search .................. 370/241, 370/252, 253, 254, 328, 331; 455/432.1–444
    See application file for complete search history.

(56) References Cited

U.S. PATENT DOCUMENTS

| | | | | |
|---|---|---|---|---|
| 5,574,938 | A * | 11/1996 | Bartow et al. .................. | 709/235 |
| 2006/0259598 | A1 * | 11/2006 | Kim et al. ..................... | 709/222 |
| 2008/0304453 | A1 * | 12/2008 | Zuniga et al. ................. | 370/331 |
| 2009/0036132 | A1 | 2/2009 | Liu et al. | |

FOREIGN PATENT DOCUMENTS

| | | |
|---|---|---|
| CN | 1472944 | 2/2004 |
| CN | 1691539 | 11/2005 |
| CN | 1728714 | 2/2006 |
| WO | WO-02078260 | 10/2002 |

OTHER PUBLICATIONS

Jin, Y. and Hongcheng, Z., *Amendment for Link Parameter Primitives*, IEEE 802.21 Media Independent Handover (2006), 8 pages.

LAN MAN Stadards Committee of the IEEE Computer Society, *Draft IEEE Standard for Local and Metropolitan Area Networks: Media Independent Handover Services*, IEEE P802.21/D00.04 (2005), 141 pages.

(Continued)

*Primary Examiner* — Pao Sinkantarakorn
*Assistant Examiner* — Wei-Po Kao
(74) *Attorney, Agent, or Firm* — Finnegan, Henderson, Farabow, Garrett & Dunner LLP

(57) ABSTRACT

A method for feeding back a link parameter configuration result includes the following steps. After receiving a configuration request for at least one link parameter from the higher layer to the lower layer, a media independent handover layer instructs the lower layer to perform link parameter configuration, and the lower layer returns the configuration result for each link parameter to the media independent handover layer after the link parameter configuration completes; the media independent layer receives the configuration result for each link parameter, and feeds back the configuration result for each link parameter to the higher layer. The method overcomes the disadvantages in the prior art, and achieves the objective that the configuration results are fed back accurately when configuration requests to a plurality of link parameters is brought up simultaneously and the configuration of some parameters is successful, failed, or rejected, thereby enabling the higher layer to obtain the accurate configuration results for link parameters.

10 Claims, 5 Drawing Sheets

OTHER PUBLICATIONS

PCT Written Opinion of the International Searching Authority, mailed Apr. 12, 2007 by the State Intellectual Property Office of PRC, for international application No. PCT/CN2006/003609, 4 pages.

EPO Office Action, dated Apr. 17, 2009, in the application No. 06 840 652.9, 6 pages.

EPO Office Action, dated Jul. 8, 2010, in the application No. 06 840 652.9, 5 pages.

Yoon Young An et al., "Reduction of Handover Latency Using MIH Services in MIPv6", Advanced Information Networking and Applications, 2006 (AINA 2006). 20th International Conference on Vienna, Austria, Apr. 18-20, 2006, Piscataway, NJ, USA, IEEE, vol. 2, Apr. 18, 2006, pp. 229-234, XP010915366.

Alan Carlton et al: "Media Independent Handover Functions and Services Specification", Internet Citation, Jul. 11, 2005, XP002426102.

IEEE P802.21/D01.00, Draft IEEE Standard for Local and Metropolitan Area Networks: Media Independment Handover Services, Lan Man Standards Committee of IEEE Computer Society, Mar. 2006, IEEE Standards Department, pp. 1-177.

First Chinese Office Action dated (mailed) Dec. 14, 2010, for Chinese application No. 2006100604365 Huawei Technology Co.

Yu, Jin, et al, "IEEE 802.21 Media Independent Handover," latest modified Feb. 15, 2006.

U.S. Office Action dated (mailed) Sep. 29, 2010, for U.S. Appl. No. 12/402,956, Huawei Technology Co.

First Chinese Office Action dated (mailed) May 25, 2011, issued in related Chinese Application No. 200610060436.5, Huawei Technologies C., Ltd (9 pages).

* cited by examiner

METHOD AND DEVICE FOR FEEDING BACK LINK PARAMETER CONFIGURATION RESULT

This application is a continuation of International Patent Application Serial No. PCT/CN2006/003609, filed Dec. 26, 2006, which claims the benefit of Chinese Patent Application Serial No. 200610060436.5, entitled "Method and Device for Feeding Back Link Parameter Configuration Result", and which was filed on Apr. 19, 2006 in the State Intellectual Property Office of the People's Republic of China, both of which are hereby incorporated by reference herein in their entireties.

BACKGROUND OF THE INVENTION

1. Field of the Invention

The present invention relates to media independent handover (MIH), and particularly, to a method and device for transmitting communication link parameters.

2. Background of the Invention

Development of communication technology brings coexistence of various communication networks in a region, and current terminal devices can also support communication with more than one network, as shown in FIG. 1. Because different networks cover different service areas and have different service capabilities, user terminals may possibly be affected in the case of handover between different media networks, but it's desired to implement seamless handover between different media networks for mobile terminals to ensure the continuity of their services.

To satisfy the requirements for seamless handover of multimode terminals among different communication networks, an architecture in which a multimode terminal can implement a media independent handover service is proposed in the 802.21 protocol, as shown in FIG. 2. As defined in the protocol, a media independent handover layer (MIH layer) is added between the second layer (MAC layer) and the third layer (network layer) of the protocol stack of a network entity, in which interfaces for higher and lower layers of the protocol stack, a station management entity (SME), and an MIH entity of the same layer are defined to provide events, commands, and information services to implement the seamless handover between different media of the multimode terminal.

Some attributes of a lower layer link will affect different applications on a higher layer in different ways. For a device supporting media independent handover, either applications (MIH users) or end users of the device (device users) need to set some attribute parameters of the lower layer link to satisfy their respective requirements. Thus, the higher layer, as a layer of an application (an MIH user) and a direct interface layer between a device and users, needs to set or change some lower layer parameters, such as different link type identifiers, power supply operating modes of different media, and disable and activation symbols of different media links, so that the attributes of the lower layer may satisfy application requirements of higher layer users (MIH users) and device users.

To enable the higher layer to configure necessary link parameters of the lower layer, a current 802.21 draft provides a parameter configuration request primitive from the higher layer to the MIH layer, that is, MIH_Configure.request (a parameter configuration request), and a configuration response primitive from the MIH layer to the higher layer, that is, MIH_Configure.response (a parameter configuration response). FIG. 3 shows the configuration process.

The higher layer specifies one or more link parameters configured for the lower layer according to a set type parameter ConfigurationRequestsSets (a parameter set for requesting configuration) in the primitive MIH_Configure.request. After receiving a parameter configuration request sent from the higher layer, the MIH layer utilizes a command of configuring link parameters on the lower layer in an existing protocol (such as 802.11, 802.16, and 3GPP) to further send a link parameter configuration request to the lower layer. After the parameter configuration is performed, the lower layer uses the primitive responding to the configuration requests in an existing protocol (such as 802.11, 802.16, and 3GP) to return configuration results (successful, failed, or rejected) of each parameter in the parameter set for requesting configuration ConfigurationRequestSets to the MIH layer. The MIH layer further utilizes a parameter ResultCode (result code of the parameter configuration) in the primitive MIH_Configure.response to feed back the configuration result of the lower layer link parameter to the higher layer.

In the current 802.21 draft definitions for two primitives for a configuration request from the higher layer to the MIH layer and a request response from the MIH layer to the higher layer are as follows:

(1) Definition of the primitive MIH_Configure.request

| MIH_Configure.request ( SourceIdentifier, DestinationIdentifier, ConfigurationRequestsSets ) | | | |
|---|---|---|---|
| Name | Type | Valid range | Description |
| Source Identifier | Identifier | Any valid individual or group identifier | The identifier of entity where the request is initiated. This field may be optionally left empty if the command is local. |
| Destination Identifier | Identifier | MIH_LOCAL, MIH_REMOTE | The destination identifier of request or response. This is the identifier of local or peer MIH Function. |
| Configuration Request Sets | Set of configuration parameters for corresponding interfaces | N/A | Containing a set of configuration parameters. |

(2) Definition of the primitive MIH_Configure.response

| MIH_Configure.response ( SourceIdentifier, DestinationIdentifier, ResultCode ) | | | |
|---|---|---|---|
| Name | Type | Valid range | Description |
| Source Identifier | Identifier | Any valid individual or group identifier | The identifier of entity where the request is initiated. This field may be optionally left empty if the command is local. |
| Destination Identifier | Identifier | MIH_LOCAL, MIH_REMOTE | The destination identifier of request or response. This is the identifier of local or peer MIH Function. |
| ResultCode | Enumerate | | Result of trying to conifer the link |

According to the previous description, the parameter ResultCode adopted by MIH_Configure.response to feed back the link parameter configuration results for the lower layer to the higher layer is an enumeration-type parameter. The value of the parameter can only be one of successful, failed and rejected. That is to say, when the link parameters of the lower layer are configured by the higher layer, if some link parameters are configured successfully and others failed or are rejected, the MIH layer cannot feed back correct configuration results for different link parameters of the lower layer to the higher layer.

SUMMARY OF THE INVENTION

The present invention is directed to a method and device for feeding back a link parameter configuration result, which solve the problem in the prior art that the MIH layer cannot feed back configuration result for each configured link parameter to a higher layer.

To achieve the aforementioned objective, the present invention adopts the technical solution as follows.

A method for feeding back a link parameter configuration result includes:

instructing, by an MIH layer, the lower layer to perform link parameter configuration after receiving a configuration request for at least one link parameter from a higher layer to a lower layer, and returning, by the lower layer, configuration result for each of the link parameters to the MIH layer after completing the link parameter configuration; and by the MIH layer, receiving the configuration result for each of the link parameters, and feeding back the configuration result for each of the link parameters to the higher layer.

A device for feeding back a link parameter configuration result includes a parameter processing unit and a result processing unit.

The parameter processing unit is adapted to receive a configuration request for at least one link parameter from a higher layer to a lower layer, send the configuration request to the lower layer, and instruct the lower layer to perform link parameter configuration.

The result processing unit is adapted to receive the configuration result for each of the link parameters fed back by the lower layer after the parameter configuration is completed, and feed back the configuration result for each of the link parameters to the higher layer.

The present invention has overcome the defects in the prior art. When the link parameter configuration results for the lower layer are to be fed back to the higher layer through a parameter configuration response command on the MIH layer, the configuration result for each link parameter is carried in the response command, and the results that the configuration of some parameters is successful, failed, or rejected are simultaneously fed back to the higher layer, thereby achieving the objective of feeding back the configuration results that the configuration of some parameters is successful, failed, or rejected when configuration requests for a plurality of link parameters are brought up simultaneously, so that the MIH layer can obtain accurate configuration results of the link parameters.

DETAILED DESCRIPTION OF THE EMBODIMENTS

Figure 1:
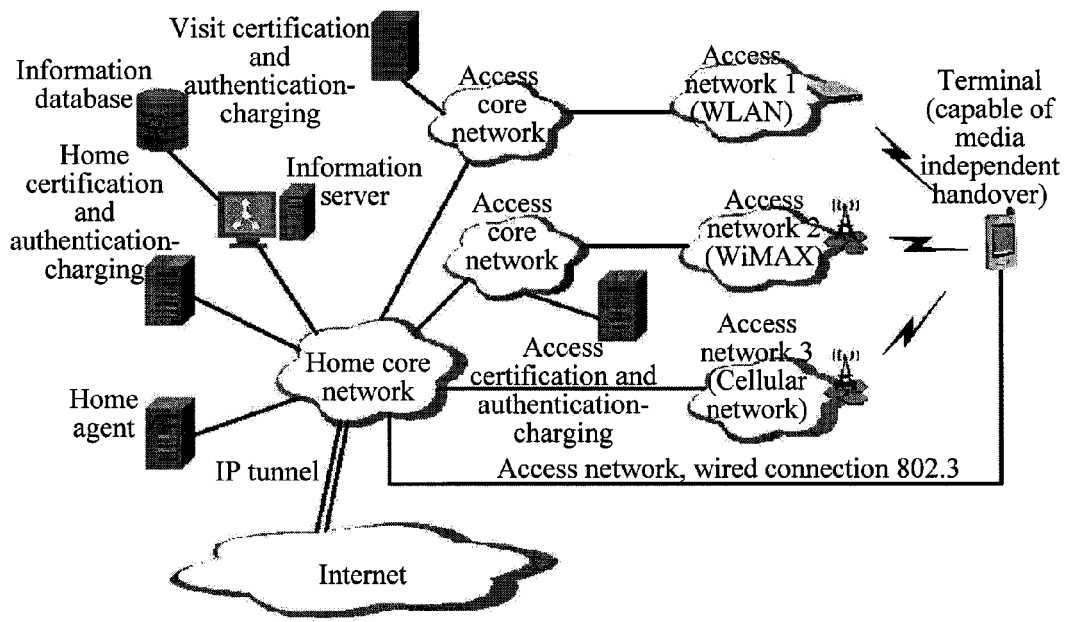
FIG. 1 is a schematic diagram of a terminal accessing multiple communication networks.
Figure 2:
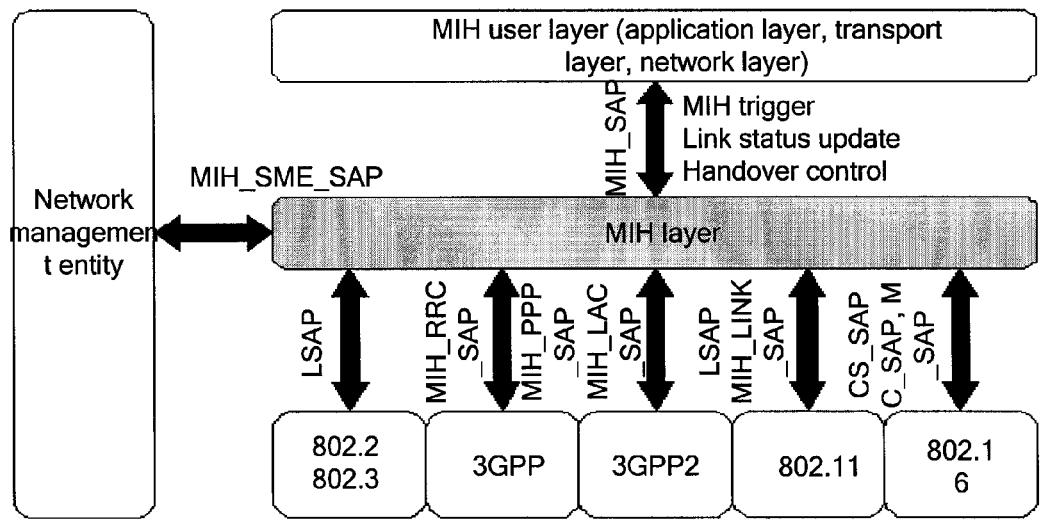
FIG. 2 is a schematic diagram of architecture of media independent handover.
Figure 3:
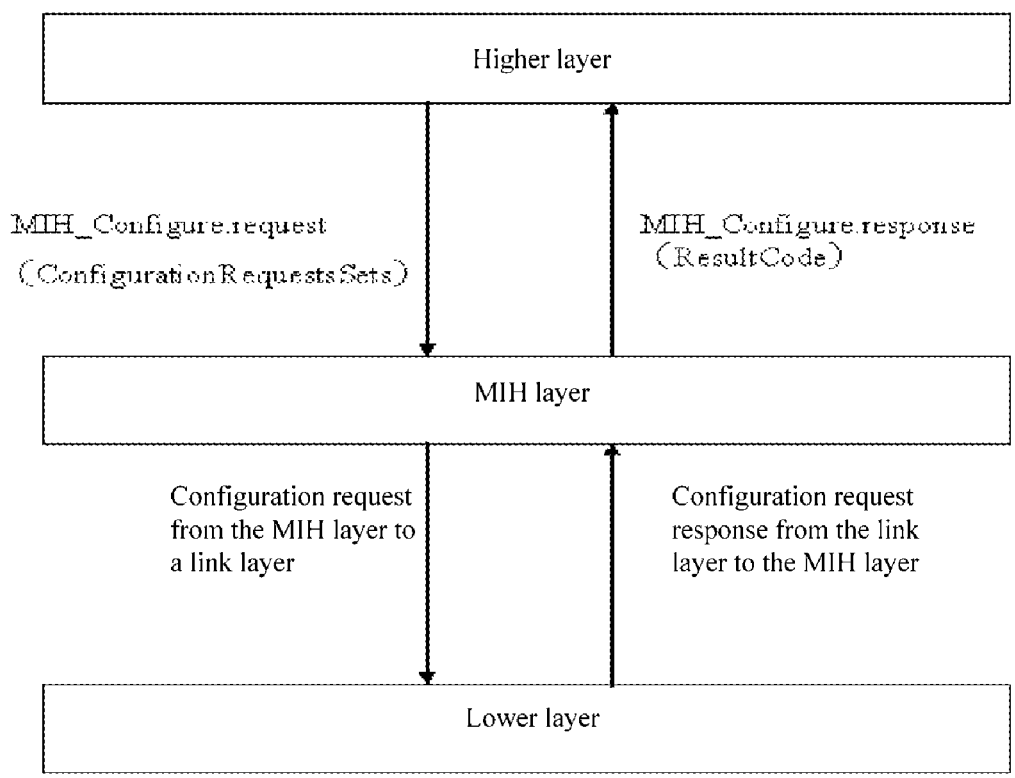
FIG. 3 is a flow chart of the link parameter configuration from a higher layer to a lower layer in the prior art.

The embodiment of the method of the present invention is realized as follows. When the link parameter configuration results for the lower layer are to be fed back to the higher layer through a parameter configuration response command on the MIH layer, the configuration result for each link parameter is carried in the response command, and the results that the configuration of some parameters is successful, failed, or rejected are simultaneously fed back to the higher layer, thereby achieving the objective of feeding back the configuration results that the configuration of some parameters is successful, failed, or rejected when configuration requests for a plurality of link parameters are brought up simultaneously, so that the MIH layer can obtain accurate configuration results of the link parameters.

When information is transmitted to the higher layer, it is allowable to adopt any standard or protocol into being capable of carrying the configuration result for each link parameter. In detail, a parameter configuration result set for carrying specific parameter configuration results is set, that is, a data structure for carrying specific parameter configuration results is set, so that the MIH layer carries the configuration result for each link parameter in a set-type parameter configuration result set and feeds back the results to the higher layer. Or, a parameter configuration result list for carrying specific parameter configuration results is set, so that the MIH layer can also carry the configuration result for each link parameter in the parameter configuration result list and feeds back the results to the higher layer. Moreover, a parameter indicating statuses of a whole configuration result, such as Status, can be set in the parameter configuration response command, which is adapted to enable the MIH layer to transmit the statuses of the configuration result to the higher layer.

The present invention will be illustrated below through an example of setting the set-type parameter configuration result set in a configuration response primitive of the MIH layer of the 802.21 protocol.

Firstly, an enumeration-type parameter ResultCode in the primitive MIH_Configure.response of the 802.21 protocol needs to be expanded to a set-type parameter ConfigurationResponseSets. The parameter ConfigurationResponseSets is a set, which includes link parameters to be configured indicated in the parameter ConfigurationRequestsSets (configuration result set) in MIH_Configure.request and configuration result statuses on the lower layer, such as (parameter1, ResultCode1), (parameter2, ResultCode2), etc. Therefore, the following amendments are made to the parameter Result- Code in the existing command primitive MIH_Configure.Response in the 802.21 protocol.

| | MIH_Configure.response ( SourceIdentifier, DestinationIdentifier, ConfigurationResponseSets ) | | |
|---|---|---|---|
| Name | Type | Valid range | Description |
| Source Identifier | Identifier | Any valid individual or group identifier | The identifier of entity where the request is initiated. This field may be optionally left empty if the command is local. |
| Destination Identifier | Identifier | MIH_LOCAL, MIH_REMOTE | The destination identifier of request or response. This is the identifier of local or peer MIH Function. |
| Configuration ResponseSets | Set containing the following parameters and configuration results | N/A | The set contains configuration parameters indicated in the configuration request and the configuration results as follows. |
| Configuration Parameters | Depend on different parameters | N/A | Configuration parameters. |
| ResultCode configuration result codes | Enumerate | Success; Failure; Rejected | Result of trying to configure the link |

After the parameters in the original command primitive are expanded, the MIH layer may feed back the configuration result statuses of different link parameters to the higher layer simultaneously.

Figure 4:
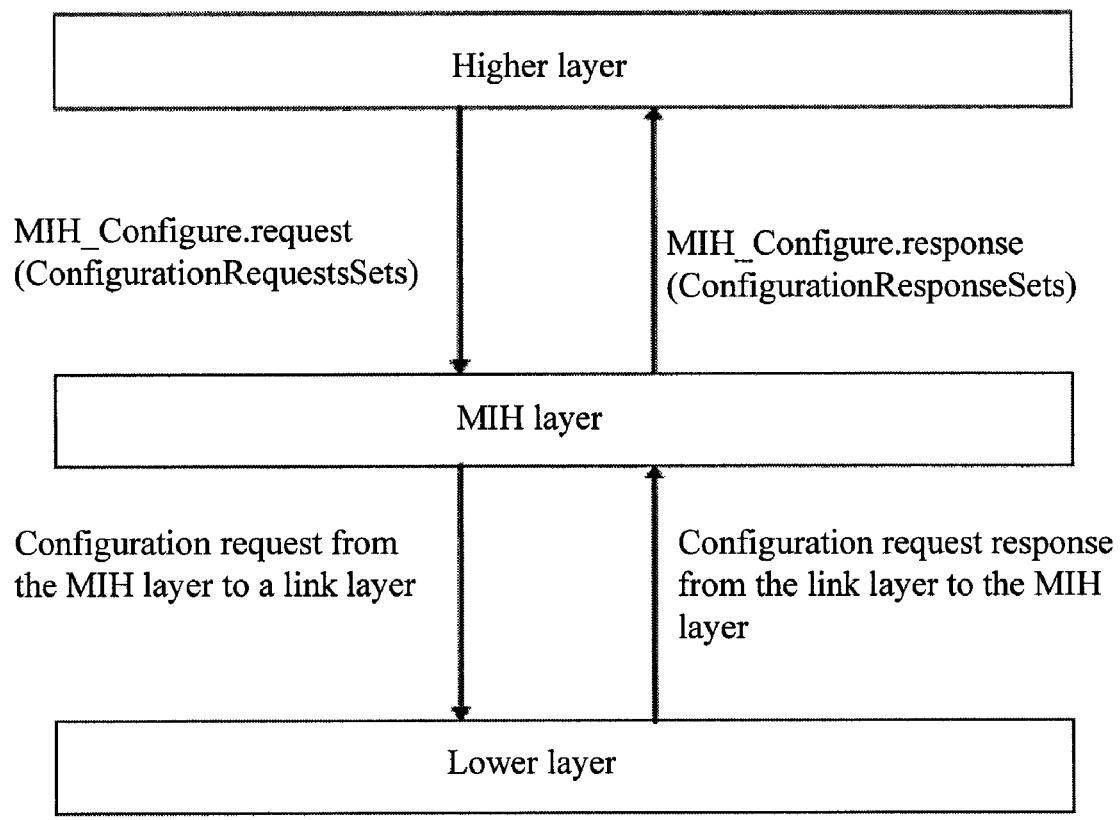
FIG. 4 is a flow chart of the parameter ConfigurationResponseSets carrying configuration results when the link parameter configuration is performed from the higher layer to the lower layer according to an embodiment of the method of the present invention.

After the parameters in the original command primitive are expanded, the higher layer performs link parameter configuration on the lower layer in the process in FIG. 4.

1. The higher layer utilizes the MIH_Configure.request command to send a link parameter configuration request to the MIH layer, in which the parameter ConfigurationRequestSets indicates that the higher layer needs to obtain the link parameter configuration set for the lower layer.

2. After receiving the command, the MIH layer sends a link parameter configuration request on the lower layer by using the link parameter configuration command defined in an existing protocol (such as 802.11, 802.16, and 3GPP).

3. After the link parameter configuration is completed, the lower layer feeds back the configuration results for the link parameters to the MIH layer by using a command primitive for responding to the link parameter configuration request defined in an existing protocol (such as 802.11, 802.16, and 3GPP).

4. The MIH layer feeds back the configuration result statuses for each parameter requested for configuration returned by the lower layer to the higher layer by using the MIH_Configure.response command through the set-type parameters ConfigurationResponseSets provided in the present invention, in which the configuration results include the name and configuration result of each parameter, such as (parameter1, ResultCode1) and (parameter2, ResultCode2), ResultCode therein respectively indicates the successful, failed or rejected status, and in the link parameter configuration, one or more parameters may be configured at a time.

Figure 5:
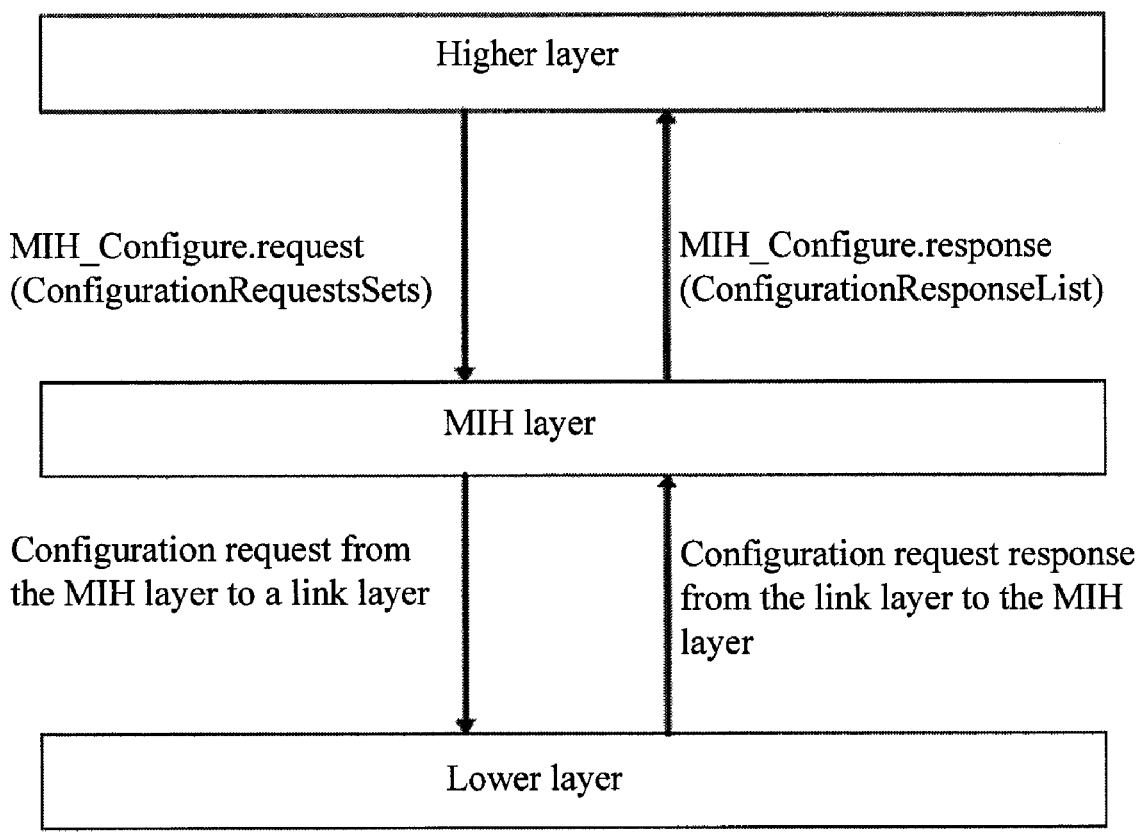
FIG. 5 is a flow chart of the parameter ConfigurationResponseList carrying configuration results when the link parameter configuration is performed from the higher layer to the lower layer according to an embodiment of the method of the present invention.

Furthermore, the set-type parameters ConfigurationResponseSets in the MIH_Configure.response feed back the configuration result for each parameter requested for configuration to the higher layer, and besides, a list formed by similar elements, such as ConfigurationResponseList (a configuration result list), can be added to MIH_Configure.response primitive, so as to feed back the configuration result for each parameter requested for configuration. As shown in FIG. 5, the link parameter configuration from the higher layer to the lower layer is substantially the same as the process in FIG. 4, and the only difference lies in that the MIH_Configure.response command of the MIH layer for feeding back the configuration results to the higher layer carries names and results of configuration parameters in the ConfigurationResponseList.

Figure 6:
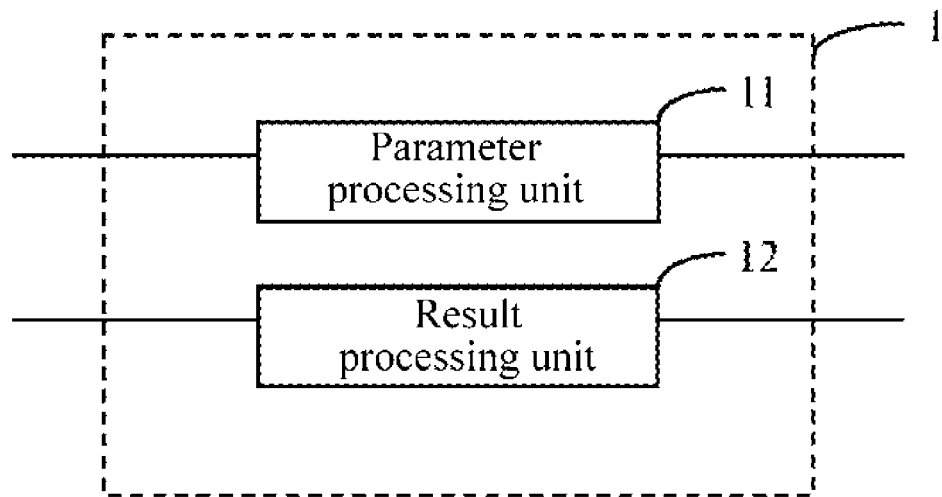
FIG. 6 is a block diagram of the first embodiment of the device of the present invention.

FIG. 6 is a block diagram of the first embodiment of the device of the present invention. The device 1 for feeding back a link parameter configuration result in FIG. 6 includes two functional units.

A parameter processing unit 11 is adapted to receive a configuration request for at least one link parameter from a higher layer to a lower layer, send the configuration request to the lower layer, and instruct the lower layer to perform link parameter configuration.

A result processing unit 12 is adapted to receive a configuration result for each of the link parameters fed back by the lower layer after the parameter configuration is completed, and feed back the configuration result for each of the link parameters to the higher layer.

Figure 7:
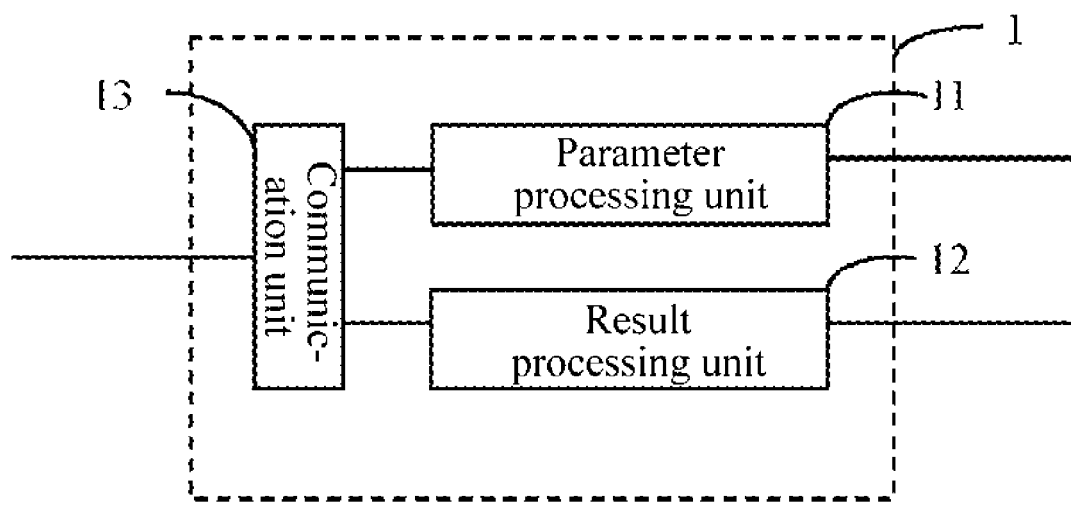
FIG. 7 is a block diagram of the second embodiment of the device of the present invention.

FIG. 7 is a block diagram of the second embodiment of the device of the present invention. The embodiments shown in FIGS. 7 and 6 are different in terms that a communication unit 13 for transmitting configuration parameters and configuration results to the MIH layer is added in the embodiment shown in FIG. 7. It is suitable to arrange the device in FIG. 6 in the MIH layer, and to use the device in FIG. 7 as an independent device at the same level as the MIH layer. Therefore, the device in FIG. 7 communicates with the MIH layer through the communication unit 13, so as to transmit configuration parameters and configuration results, and the device itself can also directly communicate with the lower layer. Because the implementation details of the embodiments in FIGS. 6 and 7 have been described in the aforementioned embodiment of the method, and data transmission among different communication entities belongs to the prior art, the implementation details of the devices in FIGS. 6 and 7 will not be repeated here.

What is claimed is:

1. A method for feeding back link parameter configuration results, comprising:
   instructing, by a device in a media independent handover (MIH) layer, a lower layer to perform link parameter configuration of a first and second link parameters after receiving a request for configuring the first and second link parameters from a higher layer;
   receiving, by the device in the MIH layer, a first configuration result for the first link parameter and a second configuration result for the second link parameter from the lower layer after the link parameter configuration is completed on the lower layer; and
   feeding back, by the device in the MIH layer, in a parameter configuration result set, a third configuration result for the first link parameter and a fourth configuration result for the second link parameter to the higher layer;
   wherein the first and the third configuration results have a same value indicating the configuration of the first link parameter is successful or erroneous; and wherein the second and the fourth configuration results have a same value indicating the configuration of the second link parameter is successful or erroneous.

2. The method according to claim 1, further comprising setting, by the device in the MIH layer, the parameter configuration result set for carrying specific parameter configuration results.

3. The method according to claim 2, wherein feeding back the third configuration result for the first link parameter and the fourth configuration result for the second link parameter to the higher layer comprises feeding back to the higher layer a set-type parameter configuration result set which carries the third and fourth configuration results; and the format of the set-type parameter configuration result is the parameter configuration result set.

4. The method according to claim 3, wherein the set-type parameter configuration result set is set in a configuration response primitive of the MIH layer of an 802.21 protocol.

5. The method according to claim 1, further comprising setting, by the device in the MIH layer, a parameter configuration result list for carrying specific parameter configuration results.

6. The method according to claim 5, wherein feeding back the third configuration result for the first link parameter and the fourth configuration result for the second link parameter to the higher layer comprises feeding back to the higher layer the parameter configuration result list which carries the third and fourth configuration results.

7. The method according to claim 5, wherein the parameter configuration result list is set in a configuration response primitive of the MIH layer of an 802.21 protocol.

8. A device for feeding back link parameter configuration results, comprising:

a parameter processing unit, configured to receive a request for configuring a first and second link parameters from a higher layer, send the request to a lower layer, and instruct the lower layer to perform link parameter configuration of the first and second link parameters; and a result processing unit, configured to receive a first configuration result for the first link parameter and a second configuration result for the second link parameter from the lower layer, and feed back, in a parameter configuration result set, a third configuration result for the first link parameter and a fourth configuration result for the second link parameter to the higher layer;

wherein the first and the third configuration results have a same value indicating the configuration of the first link parameter is successful, failed or rejected or erroneous; and wherein the second and the fourth configuration results have a same value indicating the configuration of the second link parameter is successful or erroneous.

9. The device according to claim 8, further comprising a communication unit transmitting the first and second link parameters and the first and second configuration results to an MIH layer.

10. The device according to claim 8, wherein the device is in an MIH layer.

* * * * *

UNITED STATES PATENT AND TRADEMARK OFFICE
CERTIFICATE OF CORRECTION

PATENT NO. : 8,050,190 B2  
APPLICATION NO. : 12/254147  
DATED : November 1, 2011  
INVENTOR(S) : Guiming Shu and Junxiang Guo Page 1 of 1

It is certified that error appears in the above-identified patent and that said Letters Patent is hereby corrected as shown below:

In claim 8, column 8, line 17, delete ", failed or rejected" before --erroneous--

Signed and Sealed this  
Nineteenth Day of March, 2013

Teresa Stanek Rea  
*Acting Director of the United States Patent and Trademark Office*